J. TWARDOWSKY.
VACUUM PUMP.
APPLICATION FILED SEPT. 12, 1919.

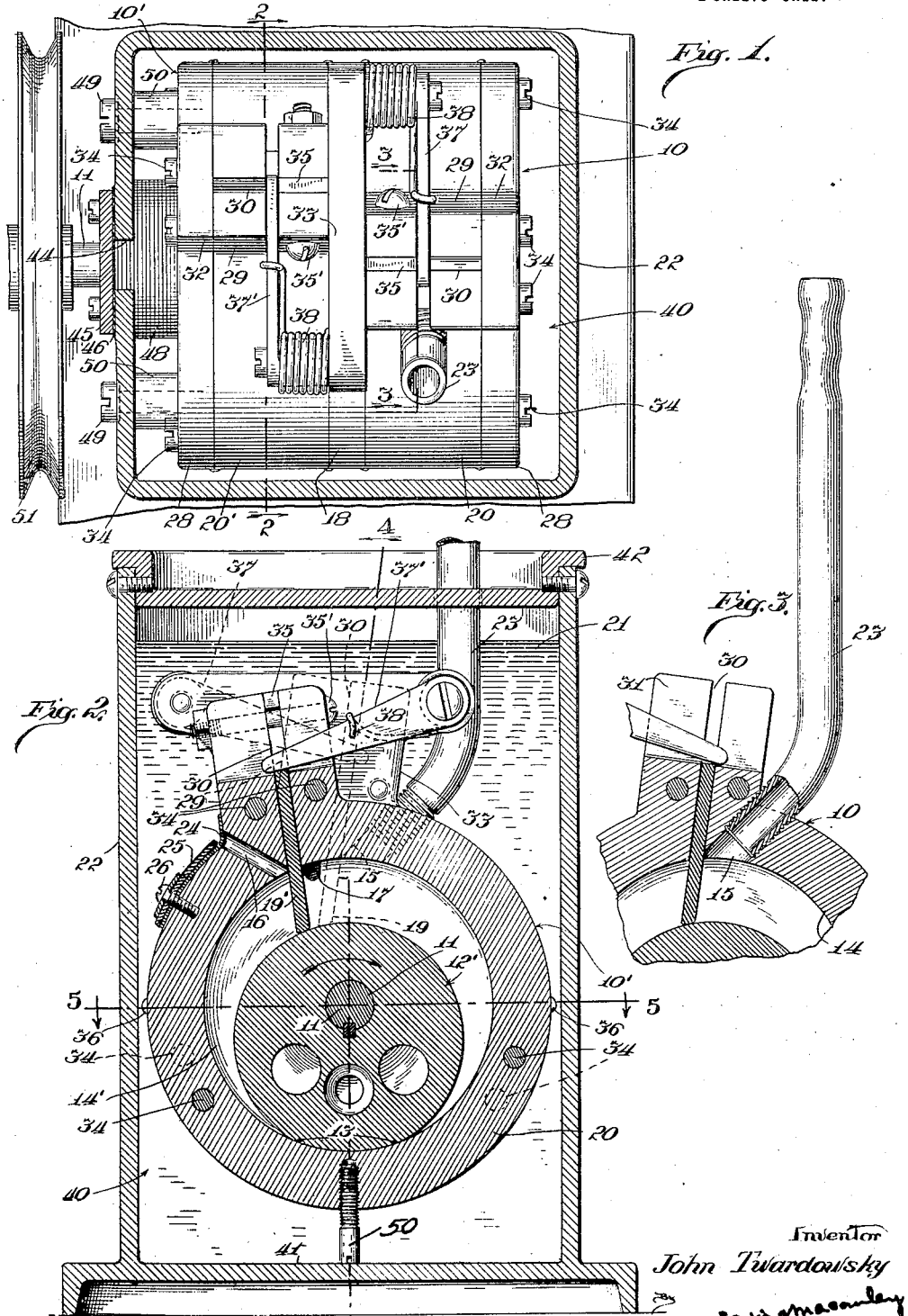

1,385,101.

Patented July 19, 1921.
2 SHEETS—SHEET 2.

Inventor
John Twardowsky
Attorneys

UNITED STATES PATENT OFFICE.

JOHN TWARDOWSKY, OF CHICAGO, ILLINOIS, ASSIGNOR TO CENTRAL SCIENTIFIC COMPANY, A CORPORATION OF ILLINOIS.

VACUUM-PUMP.

1,385,101. Specification of Letters Patent. Patented July 19, 1921.

Application filed September 12, 1919. Serial No. 323,274.

*To all whom it may concern:*

Be it known that I, JOHN TWARDOWSKY, a citizen of the Republic of Russia, residing at Chicago, in the county of Cook and State of Illinois, have invented certain new and useful Improvements in Vacuum-Pumps, of which the following is a specification.

My invention relates to vacuum pumps, and has for its general object to provide a rotary pump that is simple in construction, inexpensive to manufacture, durable enough for high duty, easy to maintain and repair, and highly efficient both in vacuum-production and in power saving.

To these and other ends my invention consists in the combinations of elements and features of construction shown and hereinafter described and claimed; one specific embodiment of my invention only, which I have found to be practical and desirable, being illustrated in the accompanying drawings for purposes of disclosure, but without intent to limit the broader aspects of my invention to its details.

Figure 4:
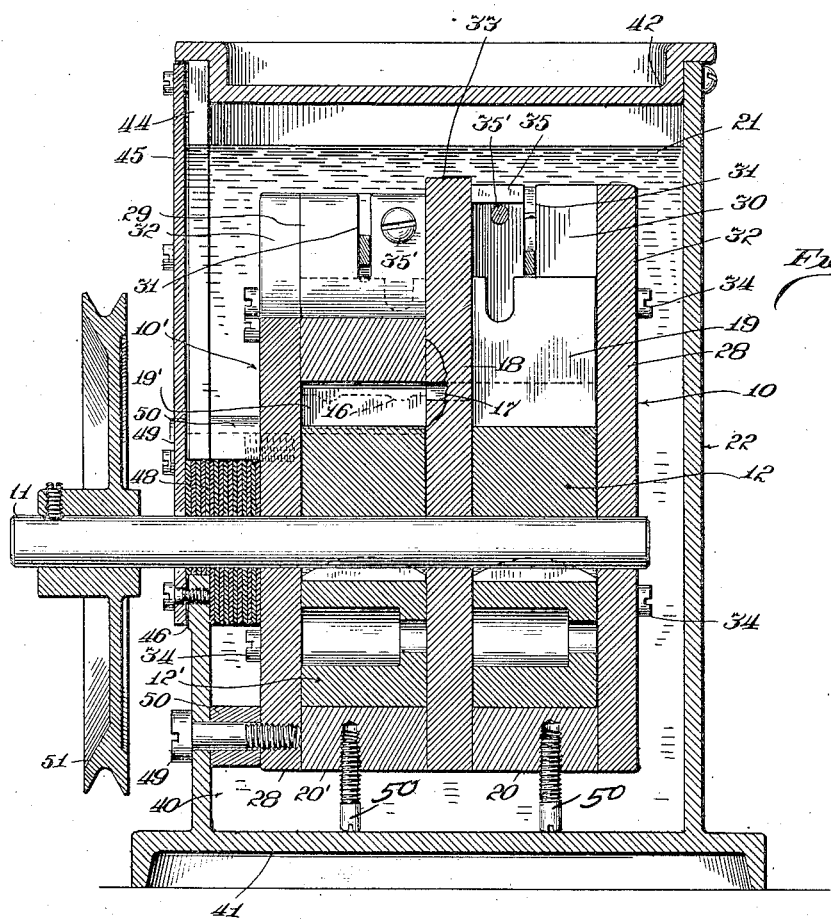
Figure 5:
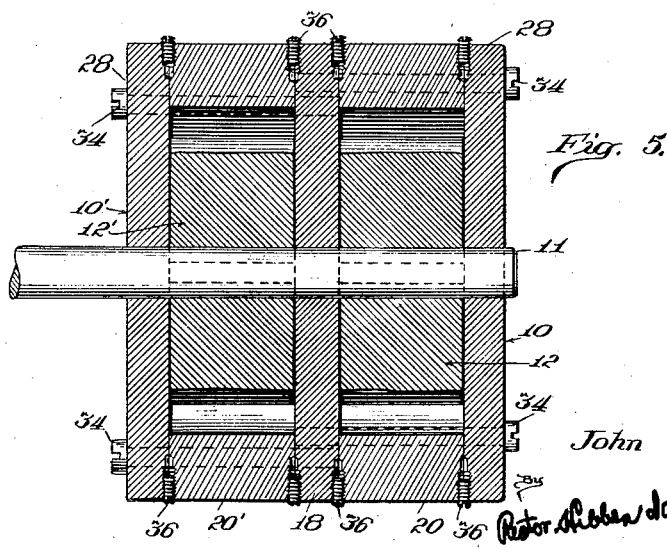

In the drawings Figure 1 is a plan view of a vacuum pump with the oil-tank removed; Fig. 2 is a vertical section transverse to the shaft, on line 2—2 of Fig. 1; Fig. 3 is a detail in section on line 3—3 of Fig. 1; Fig. 4 is a vertical section parallel with the shaft on line 4—4 of Fig. 2 and with parts broken away; and Fig. 5 is a horizontal section on line 5—5 of Fig. 2.

I have found that by constructing a vacuum pump having all of its moving parts immersed in a bath of fluid lubricant, such as oil, comprising a rotor member and its cylinder member relatively eccentrically arranged for the two members to contact throughout a line or area, one of these members being provided with a movable blade constantly contacting with the other member along a line or area so that the one area of contact is fixed and the other travels with respect to the fixed area as the rotor is revolved, there being inlet and outlet ports respectively on opposite sides of that line or area of contact that is fixed, I am enabled to produce very high vacuum rapidly and with small power-requirements. Further I have found that by making the pump in a plurality of units or sections, each constructed as above described, and arranged in tandem or "series" with the outlet of one unit constituting the inlet to the next unit, I am enabled to enhance the quick action and high-vacuum producing characteristics, so that with the construction as hereinafter described in detail and in a small pump 2.5" cylinder diameter, I have been easily able to produce in the primary inlet, or the chamber with which it is connected, reduction from atmospheric pressure to fifteen ten-thousandths of a millimeter (.0015). Of course my pump may, with advantage, be built also in large sizes, with further increase of the effectiveness in vacuum-production.

In the specific construction shown I provide a two-section pump, 10 and 10' indicating the respective units or pump-sections, these being arranged in tandem. A common shaft 11 carries preferably in exact register, the two rotors 12 and 12' each of which is a cylindrical block eccentric to the shaft and to its cylinder, the shaft and cylinders being concentric. Each rotor has an arc machined to the same radius as the cylinder to provide a relatively broad zone of effective contact with its cylinder. One cylinder, 14, has the primary intake port 15 leading thereto; the other cylinder 14' has the final outlet port 16 leading therefrom, there being a communication port 17 leading through the partition wall 18 that intervenes between the two cylinders, this communication port constituting the outlet for the cylinder 14 and the inlet for cylinder 14' to connect them in tandem. Reciprocating blades 19 and 19' extend through the peripheral walls of the cylinder bodies or rings 20, 20' and are spring-pressed inwardly to make constant contact with the respective rotors. In each cylinder such blade is arranged between the intake port and the outlet which ports are disposed as close to the blade as possible so that, as shown in Fig. 2, the communication port 17 opens just behind the blade 19 of cylinder 14 while in the cylinder 14' it opens just in front of the corresponding blade 19'. Accordingly, as the shaft 11 is rotated clockwise, from the position shown in Fig. 2, the cylinder-area on the intake side of each sliding blade increases, and that on the outlet side, decreases, as the rotor progresses, until such point is reached that the contact zone 13 of the rotor passes under the blade. When midway under the blade the contact zone 13 cuts off both the inlet and outlet.

The cut-off is brief, however, in the running of the pump, and therefore suction effect is substantially always present on the intake side and expulsion or compression effect on the outlet side of each blade, the first unit of the pump acting as a "finishing" unit, delivering air through the communication port into the second or "roughing" unit. If desired, more than two units may be employed, in series but with two units as shown, I have produced very high vacuum effects as above stated, which I believe to be superior to those secured by any other pump on the market of the same capacity. Therefore, for commercial practice I regard two units as satisfying ordinary needs. It will be noted that on each side of the blade the rotor reduces the free cylinder area to absolute zero, so that it is particularly effective in squeezing out the air or other gas to extreme attenuation, and in this regard I deem my pump to be superior to any reciprocating piston construction.

It will be understood that all moving parts are immersed in an oil bath 21 for sealing and lubrication, representing an oil body in a tank 22 in which the pump is set. An intake pipe 23 leads from the primary intake port 15 out of the tank for easy connection with the receptacle to be exhausted. The final outlet port 16 vents into the oil body, it being preferable (although not necessary) to supply the port with a check valve 24, to prevent needless in-rush of oil in the operation of the pump and thereby avoid noise and waste of power. This valve 24, as shown, may be a simple leather strip secured in place by a metal-strap 25 and screw 26.

In the specific construction I prefer to form the double cylinder of five principal pieces, namely the two side plates 28, the partition plate or mid-wall and the two cylinder rings 20, 20'. Each ring has an extension block 29 which is milled through to form a slideway 30 for the corresponding blade 19 or 19', and at right angles to the slideway 30 a slot 31 is made part-way down the extension to receive the spring-arm that depresses the blade. The blades are mere rectangular plates preferably made of bronze or other relatively soft material, so that as wear occurs it is mainly on the blade, which is of the simplest construction and readily renewable. The side plates preferably have extensions 32 registering with those of the respective cylinder rings, and the partition plate has a head 33 that covers the contiguous ends of both slideways 30.

As best shown in Figs. 2 and 5, bolts 34 extend through each side plate and cylinder ring into threaded engagement with the partition plate 18 two such bolts being in the split halves of extension 29', which are further anchored in proper spaced relation by a spacer strip 35 and screw 35'. To prevent any possibility of rotary displacement of the parts when thus assembled in accurate adjustment, I tap screw-holes in the planes of juncture of the several parallel pieces and insert screws 36 therein. This pump-casing construction involves only the simplest of machining operations and its cheapness in manufacture is notable.

While the two pump units are exactly alike in general construction, their cylinder rings and connected parts are disposed out of angular register, as best shown in Fig. 2, so that blades 19 and 19' may lie in planes respectively on opposite sides of port 17; this being a simpler and more desirable construction than the alternative of making the port 17 open in non-alining positions to the respective cylinders.

The head 33 of the partition wall carries two pivoted arms 37 and 37' that respectively bear against the upper edges of the blades 19 and 19' and are constantly pressed thereon by the coiled spring 38 encircling the arm-pivot pins.

To mount the pump structure in its oil bath, I preferably make the tank 40 as a rectangular hollow casting having a closed bottom 41, a detachable cap 42 with a suitable aperture to receive the inlet stem 23, and vent the tank. An elongated slot 44 is made in one side wall through which the shaft 11 may be dropped after the pump structure is fully assembled. A plate 45 packed with the gasket 46 of leather or the like, and apertured for the shaft 11, is screwed over the slot. To pack the shaft it is surrounded with leather washers 48 extending from the pump-side plate to the plate 45, these being severely compressed when the pump is screwed into place. Screws 49, with spacing sleeves 50 surrounding them, are used to position the pump in the casing, the screws extending into recesses in the proximate side plate 28'. To steady the pump casing in its containing shell, a rest screw 50 adjustably mounted in the cylinder ring 20 bears on the bottom of the casing.

The pump shaft may be driven by a pulley 51 as shown but the pump may easily be fitted with a motor for direct-drive.

In the operation of the pump rotation of the registering eccentric rotors in a clockwise direction results in progressive enlargement of the area on the intake side of each cylinder-blade 19 and 19' and corresponding decrease in the area on the outlet or compression side until the contact zone 13 of the rotor passes the closely adjoining outlet and intake ports and begins anew a progressive enlargement of the intake chamber and decrease in area of the exhaust chamber. It will be observed that the blades preferably are not in radial position, but rather bear on the rotor back of a radial plane. This insures that the blades glide easily on the surface of the rotor under the spring pressure of their positioning arms to minimize friction. The immersion of the whole mechanism in the oil insures against air leakage and yet, with the device well constructed on the lines illustrated, only enough oil enters the interior of the pump to keep the parts effectively filmed or lubricated. The presence of oil in the outlet or pressure side of either cylinder is of no material disadvantage, save as entailing a power loss and some noise but with the provision of the flap valve 24 heretofore described this needless introduction and expulsion of oil is eliminated.

I find that with small-sized pumps as herein shown a moderately high speed, as 200 R. P. M. may be maintained without sacrifice of reaching the maximum pressure-reduction, and that for "roughing" the pump may be run at much higher speed, so that in some instances I equip the pump with a two speed motor or with two pulley speeds, to save time in the exhaustion of the vacuum dome or bulb.

It will be understood by those skilled in the art that while I have herein described in some detail a particular embodiment of my invention, to specific features and mechanical arrangements of which I may make claim for their particular advantages, many changes in details of construction and arrangement of parts may be made without departure from the spirit of my invention within the scope of the appended claims.

What I claim is:

1. In a vacuum pump, the combination of a pair of cylinders arranged end to end and having an intervening wall, a shaft extending through them concentrically, rotors eccentrically mounted in the respective cylinders each having a relatively broad zone of contact with the interior of its cylinder, a single relatively thin blade slidable through the wall of each cylinder and contacting with the rotor said blades being spaced at different circumferential positions, an inlet to one cylinder on one side of its appropriate blade, an outlet from the other cylinder on the opposite side of its blade, there being a communication passage forming the outlet for the first said cylinder and the inlet for the second said cylinder opening through the intervening wall in the circumferential space between the blades and close to the respective appropriate sides of said respective blades, the inlet and outlet of each cylinder being within a zone no broader than the contact zone of the respective rotor.

2. A pump of the character described comprising side plates, an intervening cylinder ring having a guide slot severing the ring, means securing the ring to the side plates positioning the severed slot-sides of the ring, a relatively thin blade reciprocable in said slot, spring means pressing said blade inwardly, said cylinder having inlet and outlet ports close to and on opposite sides of the blade, and a rotor within the cylinder mounted concentrically with the cylinder axis but shaped eccentrically to the interior cylinder wall and making contact therewith throughout a zone as broad as that which includes the inlet and outlet ports and intervening blade.

3. A pump of the character described comprising side plates, an intervening cylinder ring having a guide slot severing the ring, means securing the ring to the side plates positioning the severed slot-sides of the ring, a relatively thin blade reciprocable in said slot, spring means pressing said blade inwardly, said cylinder having inlet and outlet ports close to and on opposite sides of the blade, a rotor within the cylinder mounted concentrically with the cylinder axis but shaped eccentrically to the interior cylinder wall and making contact therewith throughout a zone as broad as that which includes the inlet and outlet ports and intervening blade, an oil body in which the cylinder is immersed, a passage from outside the oil body for conducting air to the inlet port, and a valve for the outlet port immersed in the oil body.

4. In a pump of the character described, the combination of a cylinder ring having a severing slot, plates forming the cylinder end, one thereof having an extension, both securing the severed ring to the plate and fixedly positioning the confronting walls of the slot, a flat blade slidable in said slot, a spring-pressed arm mounted on said extension and inwardly pressing said blade, and an eccentric rotor concentrically mounted in said cylinder and having a relatively broad zone of contact with the cylinder wall, said blade contacting with the perimeter of said rotor and said cylinder having inlet and outlet ports on opposite sides of said blade within a zone no broader than the contact zone of said rotor.

5. In a pump of the character described, the combination of a pair of cylinder rings each having a guide-slot severing it, end plates for the remote ends of the cylinders, a partition plate intervening between adjacent ends of the cylinders and having an extension, both securing said cylinders to said plates and fixedly positioning the sides of the cylinder slot, a shaft extending concentrically through said cylinders, eccentric rotors on said shaft each having a relatively broad zone of contact with its respective cylinder, blades in the respective cylinder slots for contact with the rotor perimeters, spring-pressed arms pivoted on the partition plate extension and acting on said plates to press them inwardly, there being a communication passage forming the outlet from one cylinder and the inlet of the other cylinder, an inlet to the first-mentioned cylinder and an outlet from the second-mentioned cylinder, the inlet and outlet of each cylinder closely adjacent the respective blade and in a zone no broader than the contact zone of the rotor.

JOHN TWARDOWSKY.